United States Patent [19]

Upson et al.

[11] 4,237,194
[45] Dec. 2, 1980

[54] CONDUCTIVE POLYANALINE SALT-LATEX COMPOSITIONS, ELEMENTS AND PROCESSES

[75] Inventors: Donald A. Upson, Webster; David J. Steklenski, Rochester, both of N.Y.

[73] Assignee: Eastman Kodak Company, Rochester, N.Y.

[21] Appl. No.: 12,690

[22] Filed: Feb. 16, 1979

[51] Int. Cl.$^3$ .......................... B32B 3/00; H01B 1/00
[52] U.S. Cl. ................428/424.2; 428/931; 428/543; 428/922; 428/520; 252/500; 430/527; 430/528; 430/69; 57/901; 260/DIG. 19; 260/DIG. 16; 260/29.2 TN; 260/29.6 H; 174/68 A
[58] Field of Search ................... 430/62, 528, 527, 69; 252/500, 511; 427/58, 108; 260/DIG. 15, DIG. 19, DIG. 18, DIG. 16; 174/68 A

[56] References Cited

U.S. PATENT DOCUMENTS

| | | | |
|---|---|---|---|
| 3,963,498 | 6/1976 | Trevoy | 428/411 X |
| 4,011,176 | 3/1977 | Saunders et al. | 252/500 |
| 4,025,691 | 5/1977 | Trevoy | 428/411 |
| 4,025,704 | 5/1977 | Trevoy | 526/16 |

OTHER PUBLICATIONS

Research Disclosure #15930, Jul. 1977, Industrial Opportunities, Hampshire, UK.

*Primary Examiner*—John D. Walsh
*Attorney, Agent, or Firm*—J. Jeffrey Hawley

[57] ABSTRACT

A coating composition useful in forming conductive layers comprises a latex having water as a continuous phase and, as a dispersed phase, hydrophobic polymer particles having associated therewith a polyaniline salt semiconductor. The coating composition can be coated on a variety of supports to produce conductive elements. The coating compositions are particularly useful in forming antistatic layers for photographic elements or conducting layers for electrophotographic and electrographic elements. Also disclosed is a preferred process for preparing a latex coating composition comprising the steps of loading polymer particles with the polyaniline component of the polyaniline acid addition salt semiconductor and then acidifying the latex to form a polyaniline salt coating composition.

8 Claims, No Drawings

CONDUCTIVE POLYANALINE SALT-LATEX COMPOSITIONS, ELEMENTS AND PROCESSES

BACKGROUND OF THE INVENTION

1. Field of the Invention

The present invention relates to new conductive compositions, elements and processes. More specifically, the conductive compositions of the present invention are dispersions of hydrophobic latex polymer particles having associated therewith polyaniline acid addition salt semiconductors. Processes for making polyaniline saltcontaining latices and methods for preparing elements having coatings of the compositions form other aspects of the present invention.

2. Description Relevant to the Prior Art

The unwanted buildup of static electricity on an insulating support has been a continuing problem. It is well-known that a thin conductive layer will prevent static buildup but, while it is possible to formulate a conductive composition that can be coated on a support, it has been quite difficult to combine these conductive properties with other desirable physical properties.

The stringent physical and optical requirements for photographic elements make the formulation of suitable antistatic compositions for these elements particularly troublesome. Many conductors are known which can be coated on photographic elements to provide static protection. One particularly useful class of compositions which can be used in photographic elements is a composition containing the polyaniline acid addition salt (hereinafter "polyaniline salt") semiconductor described in U.S. Pat. No. 3,963,498 issued June 15, 1976, to Trevoy. These semiconductors are formed by the reaction of a neutral polyanilineimine (hereinafter "polyaniline") with an acid. These semiconductors offer a number of advantages when used in antistatic coatings, particularly when used with photographic films. For example, because these materials are electronic conductors as opposed to ionic conductors, their conductivity is relatively independent of relative humidity. Thus, they retain high conductivity under conditions of low humidity where the buildup of unwanted static electricity is particularly difficult to control. Further, these semiconductors retain their conductivity when coated in a suitable binder and therefore can be used in a variety of elements using conventional coating techniques. Still another advantage of these semiconductors is that they are relatively inexpensive and therefore can be used on a relatively large scale at low cost.

The polyaniline salt semiconductors of Trevoy offer a number of advantages; however, further improvements have been sought. While coatings containing a relatively low coverage of these semiconductors are useful in reducing the resistivity of an insulating support to a certain extent, relatively high coverages of these semiconductors, when used in conventional coating compositions, are required to achieve sufficient conductivity to eliminate static problems under severe conditions. For example, in order to achieve resistivities on the order of $10^6$ ohm/sq, it is necessary to coat the semiconductors of Trevoy at coverages greater than about 35 mg/m$^2$. Unfortunately, these semiconductors are colored and at these coverages impart to the elements on which they are coated an undesirable density. As an illustration, a coating containing 35 mg/m$^2$ of a typical semiconductor disclosed in the Trevoy patent, e.g., N-{p-[(4-methoxyanilino)anilino]phenyl}-1,4-benzoquinone imine p-toluenesulfonic acid salt, would have a highly desirable conductivity of about $1.0 \times 10^8$ ohm/sq, but would also have an integrated optical density of about 0.025 in the visible portion of the spectrum. If the coverage of the polyaniline salt in such a layer were to be reduced so as to reduce the undesirable optical density, the resistivity would increase. For certain critical applications such as, for example, in the production of transparent photographic materials, it would not be possible to get sufficiently high conductivity while at the same time desirable low optical density. It is readily apparent that improvements in the semiconductive coating compositions would be extremely desirable.

Aside from the optical density problems associated with the semiconductors of Trevoy, these semiconductors are, in general, insoluble in water. This can be undesirable because coating layers onto photographic supports is more safely and economically accomplished if water can be used as the basis for the coating composition. Extensive milling permits dispersions of water-insoluble semiconductors to be made in the presence of protective colloids such as gelatin. However, milling in this manner is time-consuming and energy-intensive. It would be highly desirable if a suitable method of coating semiconductors from water could be devised.

It is known to use latex dispersions as binders for conductive materials. In conventional processes such as those described in U.S. Pat. 4,011,176, the antistatic materials, such as semiconducting compounds, are simply dispersed in the continuous phase, along with the latex particles. This usually requires extensive mixing and/or milling in order to disperse water-insoluble antistatic material. When this is attempted with polyaniline salt semiconductor antistatic materials, it produces a useful aqueous-based coating composition. However, when the latex is coated and coalesced on a support, high coverages of the polyaniline salt semiconductor are still required to produce the desired high conductivity. This high coverage again results in undesirable density.

While for many reasons semiconductors are highly desirable in photographic elements, the prior art does not suggest a solution to the difficult problems discussed above. There is no suggestion as to how these semiconductors can be coated from aqueous solutions in order to produce high-conductivity coatings.

SUMMARY OF THE INVENTION

We have found that the above difficult problems can be substantially reduced by preparation of a coating composition which uses a polyaniline salt semiconductor, the composition being prepared by particular methods using particular materials. By using the materials and methods described herein, we are able to produce an aqueous-based coating composition which is capable of forming coatings having, at the same time, high conductivity and low optical density. In one aspect of our invention, we provide an element comprising a support having thereon a conductive layer, the conductive layer comprising a coalesced, cationically stabilized latex binder and a polyaniline salt semiconductor formed by the reaction of a polyaniline and an acid. The improvement according to our invention is that the semiconductor and the latex are chosen so that the semiconductor is associated with the latex before coalescing.

The coating composition which forms the layer described above is another important aspect of our invention. The coating composition comprises a latex having water as a continuous phase and, as a dispersed phase, cationically stabilized hydrophobic polymer particles having associated therewith the semiconductor. The key to the present invention is that, in order to produce layers having high conductivity at low coverage, it is necessary that the semiconductor be associated with the hydrophobic latex particle in the coating composition. By "associated with" we mean that the semiconductor is attached to or located within the polymer particle; that is, the semiconductor is not merely mixed or dispersed with the latex dispersion as is known in the art, but must become a part of the individual polymer particles. Thus, substantially all of the semiconductor in the coating composition must be adsorbed, absorbed or otherwise become an integral part of the polymer particles. By preparing a coating composition wherein the semiconductor is associated with the latex particles, we are able to produce coatings having unexpectedly high conductivity at low coverages.

Another aspect of our invention is a preferred process for associating the semiconductor with the polymer particles in the latex. While other processes can be used, the process of the present invention is particularly preferred. The process comprises the steps of:

(1) forming a solution by dissolving a polyaniline in a water-miscible organic solvent, (2) forming a latex by dispersing cationically stabilized hydrophobic loadable polymer particles in an aqueous continuous phase, (3) blending the latex with the solution, (4) loading the polymer particles by removing the organic solvent thereby forming a polyaniline-loaded latex, and (5) forming a polyaniline salt-loaded latex by adding sufficient acid to the polyaniline-loaded latex to convert substantially all of the polyaniline-loaded latex to polyaniline salt-loaded latex.

In yet another aspect of the present invention, we provide a process of preparing a conductive element comprising a support having thereon a conductive layer, the process comprising the steps of:

(1) forming the latex coating composition described above, (2) coating the latex on a support, (3) removing the continuous phase of the latex and (4) coalescing the latex so as to form the layer.

Using the coating compositions and processes of our invention, the layers of our invention can be highly conducting while at the same time have very low coverages of the semiconductor. This means a savings in materials in the coating process and coatings with very low optical density. These advantages are obtained with coating compositions which can be easily and safely coated because of their aqueous base.

Further, the layers of our invention unexpectedly exhibit highly uniform conductivity over the surface of the layer.

DETAILED DESCRIPTION OF THE INVENTION

According to the present invention, the semi-conductor must be associated with the hydrophobic latex particle in the coating composition. Layers coated from such coating compositions have desirable high conductivity at low coverages. One particularly preferred method of preparing the polymer particles having the polyaniline salt semiconductor associated therewith is to load the particles with the semiconductor according to an adaptation of the method described by Chen in *Research Disclosure*, No 15930, Vol 159, July, 1977. It is preferred to adapt the process of Chen by first forming a polyaniline-loaded latex and then converting this latex to a polyaniline salt-loaded latex by treatment with acid. The adapted process of Chen is particularly preferred when used with the polyaniline salt semiconductor because large quantities of the semiconductor can be associated with the polymer particles using this method.

The preferred adapted loading process is a five-step process. First, a solution is formed by dissolving a polyaniline in a water-miscible organic solvent. Second, a latex is formed by dispersing hydrophobic loadable polymer particles in an aqueous continuous phase. Third, the latex is blended with the solution of the polyaniline. Fourth, the polymer particles are loaded by removing the organic solvent. This step forms a polyaniline-loaded latex. Finally, in the fifth step, the polyaniline-loaded latex is converted to a polyaniline salt-loaded latex by acidifying the latex with a suitable acid. The resulting polyaniline salt-loaded latex forms an excellent coating composition having a semiconductor associated with the latex polymer particles. A useful conductive element can be prepared by coating the described latex coating composition on a suitable support, removing the continuous phase of the latex and coalescing the latex so as to form a conductive layer on the support.

The polyanilines which can be used to form the coating compositions and elements of the present invention are described in U.S. Pat. No. 3,963,498 to Trevoy, the entire disclosure of which is hereby incorporated by reference. More particularly, the polyaniline component is the D moiety which is described by Trevoy in column 3, line 15, through column 6, line 8. Specific useful polyanilines can be found in Table 1 of the patent at column 6, line 63, through column 7, line 30. While all of the polyanilines described by Trevoy can be used in the preferred compositions and elements of the present invention, the preferred imines are N-{p-[4-(p-methoxyanilino)anilino]-phenyl}-1,4-benzoquinone imine (polyaniline (a)), N-{p-[p-(anilino)anilino]-phenyl}-1,4-benzoquinone diimine (polyaniline (b)) and N-{p-[4-(p-methylanilino)anilino]}phenyl-1,4-benzoquinone imine (polyaniline(c)).

In order to form the loaded latex which is useful as the preferred coating composition of the present invention, the polyaniline or semiconductor is dissolved in a water-miscible organic solvent. Useful solvents are those which:

(a) can be dissolved in distilled water at 20° C. to the extent of at least 20 parts by volume of solvent in 80 parts by volume of water;

(b) have boiling points (at atmospheric pressure) above about −10° C.;

(c) do not detrimentally react chemically or physically with latex polymer or the semiconductor and (d) do not dissolve more than about 5 weight percent of the loaded polymer particles at 20° C.

Useful water-miscible organic solvents are water-miscible alcohols, ketones and amides, tetrahydrofuran, N-methyl-2-pyrrolidone, dimethylsulfoxide and mixtures thereof. Particular examples of these solvents include acetone, ethyl alcohol, methyl alcohol, isopropyl alcohol, dimethylformamide, methyl ethyl ketone and the like. The polyanilines are generally soluble in acetone and this is the preferred solvent for the preferred process.

Useful latex polymers, in addition to being capable of associating with the semiconductor, should meet several requirements. The latex polymers must be cationically stabilized and should have a glass transition temperature less than about 65° C. The polymer particles should be capable of forming a fully coalesced layer under conditions which do not degrade the physical or chemical properties of the support.

The aqueous latices which are the preferred coating compositions consist essentially of water as a continuous phase and loaded polymer particles as a dispersed phase. The loadable polymer particles are those which meet the following test. At 25° C., the loadable polymer particles being tested must (a) be capable of forming a latex with water at a polymer-particle concentration of from 0.2 to 50 percent by weight, preferably 1 to 20 percent by weight, based on total weight of the latex, and (b) when 100 ml of the latex is then mixed in an equal volume of the water-miscible organic solvent to be employed in forming the loaded polymeric latex composition, stirred and allowed to stand for 10 minutes exhibit no observable coagulation of the polymer particles. Further, the latex, after being loaded with the polyaniline, must be able to be acidified without exhibiting observable coagulation, again for about 10 minutes. Useful loadable polymer particles are disclosed by Chen in *Research Disclosure*, No 15930, Vol 159, July, 1977. The entire disclosure of this *Research Disclosure* is hereby incorporated by reference. More particularly, useful loadable polymer particles are the cationically stabilized polymers of the polymers described in the *Research Disclosure* at page 63, column 2, through pages 67, column 1.

T. J. Chen has now discovered that certain cationically stabilized polyurethane latex polymer particles meet his described loading test. He has unexpectedly found that these urethanes form loaded latices which are more stable than loaded latices which are made from other conventional latices. By "stable" it is meant that the loaded urethanes can be stored for long periods, i.e., 30 days or longer, without observable coagulation. As a result of this property, hydrophobes which have been difficult to load because of crystallization, etc, can now be loaded onto/into these urethanes. The discovery that loaded, cationically stabilized polyurethanes are surprisingly stable is not our discovery, but is the discovery of T. J. Chen made prior to our discovery that cationically stabilized latices loaded with polyaniline salt semiconductors form coatings with unexpected conductivity.

Polyurethane latices which can be loaded according to the discovery of Chen are polyurethanes derived from a polyol component and an isocyanate component. The polyol unit can comprise:

(a) from 10 to 100 mole percent of one or a mixture of prepolymers having two or more than two hydroxy end groups and a molecular weight from 300 to 20,000, preferably from 500 to 6,000, the recurring units in said polyols being lower alkyl ethers or lower alkyl esters; and correspondingly (b) 90 to 0 mole percent of a low-molecular-weight diol with or without a functionality to impart a positive or a negative charge to the resulting polyurethane latex polymer.

The isocyanate component can comprise one or a mixture of diisocyanates conforming to the structure OCNRNCO, wherein R is alkylene, alkylene-containing hetero atoms such as oxygen, cycloaliphatic, e.g., cyclohexylene, alkylenebiscyclohexylene and isophorone-1,4-diyl, arylene, substituted arylene, alkylenebisarylene and arylenebisalkylene. More particularly, urethanes which can be loaded according to the discovery of Chen to form highly stable latices can be represented by the structure:

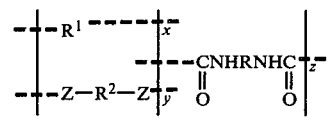

wherein R is as described above; $R^1$ is:

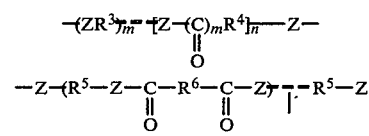

wherein each Z is independently —O— or —NH—; $R^2$, $R^3$ and $R^5$ are independently selected from alkylene of about 2-10 carbon atoms, cycloalkylenebis(oxyalkylene) such as 1,4-cyclohexylenebis(oxyethylene), arylenebisalkylene such as phenylenebismethylene, or the residue of a poly(alkylene oxide) group such as +alkylene-O+$_p$, the alkylene having about 2-4 carbon atoms and p being about 2-500; $R^4$ is an alkylene group of about 2-10 carbon atoms; $R^6$ is alkylene of about 2-10 carbon atoms or arylene such as phenylene, naphthylene, bisphenylene, oxydiphenylene and the like; l and n are independently 2-500; m is 0 or 1; y is 0 to 90 mole percent of the diol component of the polyurethane; and z is the total isocyanate component of the polyurethane; the ratio of (x+y) to z being about 0.4 to 1.0.

A wide variety of polyols and diisocyanates can be used to form stable loadable urethanes according to Chen. Appropriate polyols include: (1) diols such as alkylenediols of 2-10 carbon atoms, arylenediols such as hydroquinone, and polyether diols [HO+CH$_2$CH$_2$O+$_n$H]; (2) triols such as glycerol, 2-ethyl-2-hydroxymethyl-1,3-propanediol, 1,1,1-trimethylolpropane and 1,2,6-hexanetriol; (3) tetraols such as pentaerylthritol; higher polyols such as sorbitol; and poly(oxyalkylene) derivatives of the various polyhydric alcohols mentioned. Other desirable polyols include linear polyesters of MW ~500 with terminal hydroxyl groups, low acid numbers and water content; block copolymers of ethylene and propylene oxides with a diamine such as ethylenediamine; and caprolactam polymers having end hydroxyl groups. Typical diisocyanates include 2,4- and 2,6-toluene diisocyanate, diphenylmethane-4,4'-diisocyanate, polymethylene polyphenyl isocyanates, bitolylene diisocyanate, dianisidine diisocyanate, 1,5-naphthalene diisocyanate, 1,6-hexamethylene diisocyanate, bis(isocyanatocyclohexylmethane diisocyanate, isophorone diisocyanate, 2,2,4-(2,4,4)-trimethylhexamethylene diisocyanate, and xylylene diisocyanate.

Polyurethanes which are useful herein are those described above which are cationically stabilized. These polyurethanes comprise a polyol unit which imparts a positive charge to the polyurethane. Useful polyurethanes which are cationically stabilized include those described in U.S. Pat. No. 3,873,484, the disclosure of which is hereby incorporated by reference. Latices of this type are commercially available from the Witco Chemical Corp under the designation Witcobond W-210 ™.

Other particularly useful cationically stabilized latex polymer dispersion which have been loaded with polyaniline salt semiconductor are listed below. The number in parentheses after a polymer, here and throughout this specification, indicates the weight percentage of the respective monomers in the polymer.

(1) poly(n-butylmethacrylate-co-vinylbenzyl chloride) (90/10) quaternized with trimethylamine
(2) poly[vinyl acetate-co-tetrahydrofurfuryl methacrylate-co-methyl methacrylate-co-(N,N,N-trimethyl-N-vinylbenzylammonium chloride)] (70/20/5/5) quaternized with trimethylamine
(3) poly(vinyl acetate-co-methyl methacrylate) (90/10)
(4) poly[tetrahydrofurfuryl methacrylate-co-N,N,N-trimethyl-N-vinylbenzylammonium chloride)] (90/10) quaternized with trimethylamine
(5) poly{methyl acrylate-co-tetrahydrofurfuryl methacrylate-co-[2-(methacryloyloxy)ethyl trimethylammonium methosulfate]} (35/60/5)
(6) poly[n-butyl methacrylate-co-butyl acrylate- co-(N,N,N-trimethyl-N-vinylbenzylammonium chloride)] (70/20/10) quaternized with trimethylamine
(7) poly(vinyl acetate)

After the solution of the polyaniline and the dispersion of the loadable polymer particles are formed, the two are blended. Generally, it is preferred to blend the water-miscible organic solvent solution into the dispersion of the loadable polymer particles. Blending is undertaken so that the polyaniline remains in solution and the loadable polymer particles remain dispersed.

While blending of water and the loadable polymer particles with the water-miscible organic solvent solution of the polyaniline can result in significant loading of the polyaniline into the polymer particles, some of the polyaniline could still remain in the continuous phase dissolved in the water-miscible organic solvent. It is preferred further to load the polyaniline into the polymer particles by removing at least a major portion of the water-miscible organic solvent. While any of the methods of removing the water-miscible organic solvent disclosed in the above-cited *Research Disclosure* of Chen can be used, it is preferred to remove rapidly the water-miscible organic solvent by evaporation under reduced pressure. The result of these steps is that the loadable polymer particles have associated therewith (i.e., loaded) the polyaniline component of the semiconductor.

It is preferred that the loading of the polyaniline take place at a substantially neutral pH. The polyaniline-loaded latex may only be stable at a pH of 7.0 for about 1–3 wks. However, after acidification to form the polyaniline salt-loaded latex, the pH is typically about 2.7. At this pH, the coating composition is stable for long periods, i.e., greater than 30 days.

It is preferred that the loading of the polyaniline and the subsequent acidification of the loaded latex take place in the presence of a surfactant. As is known in the art, the surfactant aids in keeping the hydrophobic latex polymer particles in suspension. The surfactant is typically present at a concentration of about 2 percent by weight of the coating composition, although this concentration can be varied depending on the particular surfactant, latex, solvent and polyaniline. Preferred surfactants are those having an HLB (hydrophilelipophile balance) between about 13 and 17. Surfactants meeting this criteria include ethoxylated alkyl phenols such as Igepal CO-730 ™, Triton X-102 ™, Triton X-165 ™ and Igepal CO-630 ™; and block copolymers of poly(ethylene oxide) and poly(propylene oxide) such as Pluronic L-64 ™ and Pluronic L-44 ™.

The weight ratio of the polymer particles to polyaniline in the coating composition and therefore the coatings themselves can vary over a wide range. It has been found that this ratio has little effect on the relationship between resistance of the coating and the coverage of the semiconductor. The amount of binder can therefore be chosen to optimize the physical properties of the layer and the properties of the coating composition to facilitate coating. A useful range of the weight ratio of polymer to polyaniline is between about 1:1 and 20:1. Particularly desirable layers and coating compositions are formed when this ratio is between 4:1 and 10:1.

The next step in the preferred process is to convert the polyaniline-loaded polymer particles to polyaniline salt-loaded particles by acidifying the loaded latex dispersion which resulted from the previous step. Acidifying of the latex can be accomplished by simply mixing a solution containing the appropriate acid with the latex dispersion. The amount and particular acid should be chosen so that (a) substantially all of the polyaniline is converted to polyaniline salt and (b) the resulting latex is stable for a time sufficient to form coatings. Where the acid chosen has the effect of destabilizing the latex, the coating composition containing the polyaniline salt-loaded latex must be coated immediately. In preferred embodiments, however, the latex should be storage-stable. Therefore, the acid should be selected so that, when it is mixed with the polyaniline-loaded latex, the resulting polyaniline salt-loaded latex is stable for at least 10 minutes. The selection of a suitable acid to form stable latices depends upon the presence of surfactants, the particular loadable polymer particles chosen, the particular polyaniline chosen, the pH of the initial polyaniline-loaded latex and other factors. Useful acids include halogen acids, e.g., hydrogen chloride, hydrogen bromide, hydrogen fluoride, hydrogen iodide, fluoroboric acid and the like; sulfur acids such as sulfurous acid, sulfuric acid, thiosulfuric acid, thiocyanic acid and the like; acids of phosphorous such as phosphorous acid, phosphoric acid and the like; nitrogen acids such as nitrous acid, nitric acid and the like. Organic acids including mono-, di- and polyfunctional organic acids are also useful. Useful organic acids include aliphatic acids, both saturated and unsaturated, having from 1 to about 8 carbon atoms, for example, formic, acetic, propionic, maleic and the like; aromatic acids such as phthalic, terephthalic, benzoic and the like; and organic compounds containing acidic hydrogen atoms such as barbituric acid and 2-barbituric acid. Preferred acids for forming stable latex dispersions include phosphoric acid, nitric acid, and methanesulfonic acid.

Phosphoric acid forms stable latex dispersions and, in addition, forms coatings having exceptional conductivity, even in comparison with similar coatings of the invention using other acids. Phosphoric acid is therefore particularly preferred.

As mentioned above, sufficient acid is added to the latex to convert substantially all of the polyaniline to polyaniline salt. It can be desirable in some circumstances to add excess acid to the polyaniline-loaded latex. By "excess" we mean more than a stoichiometric amount. Excess acid assures that the latex forms conductive coatings even if some of the acid is lost from the coating, such as by leaching. The amount of acid added to the polyaniline-loaded latex can therefore vary over a wide range. Typically, useful amounts of acid fall within the range of 1.0 to 10.0 moles acid/mole imine. Where this ratio is greater than about 4:1, an overcoat layer may not properly adhere to the conducting layer. Where this ratio is less than about 1.0, the layer may not have sufficient conductivity. Because the acid component of the polyaniline salt semiconductor can vary over this wide range, it is more accurate to describe the coverage in a layer of the semiconductor in terms of the coverage of the polyaniline.

Preparation of the preferred coating composition comprising hydrophobic latex polymer particles loaded with polyaniline salt semiconductor has been described in detail. Loading in the described manner is the preferred method for associating the semiconductor with the latex. It will be understood, however, that other methods can be used. For example, the semiconductor and the latex polymer can be chosen so that the semiconductor is soluble in a monomer which is used to form the latex polymer. So long as the polyaniline salt semiconductor is capable of being associated with the latex, the coating composition will produce layers having unexpectedly high conductivity in comparison with layers made from conventional coating compositions.

The weight percent solids in the latex coating compositions of the present invention can vary widely. As is well-known in the art, the percent solids, along with the method of coating, has a substantial influence on the coverage of the layer that results from the coalescence of the coating composition. By "solids" in this context we mean the suspended hydrophobic polymer particles including the semiconductor associated therewith. A useful range for the weight percent solids in the coating composition is between about 0.2 percent and about 15 percent.

Coating compositions having latex polymer particles having associated therewith the semiconductor can be coated on a wide variety of supports to form useful conducting elements. The support can be a number of materials which can take a number of forms. For example, the coating compositions described herein can be coated on polymeric materials such as poly(ethylene terephthalate), cellulose acetate, polystyrene, poly(methyl methacrylate) and the like. The compositions can also be coated on other supports such as glass, paper including resin-coated paper, and metals. Fibers, including synthetic fibers, useful for weaving into cloth, can be used as the support. Planar supports such as polymeric films useful in photography are particularly useful. In addition, the compositions of the present invention can be coated onto virtually any article where it is desired to have a conductive coating. For example, the compositions can be coated on small plastic parts to prevent the unwanted buildup of static electricity or coated on small polymeric spheres or other shapes such as those used for toners in electrography and the like.

The compositions of the present invention can be coated onto the support using any suitable method. For example, the compositions can be coated by spray coating, fluidized bed coating, dip coating, doctor blade coating or extrusion hopper coating, to mention but a few.

A major advantage of the conductive layers of the present invention is that they exhibit surprisingly high conductivity at low coverage of the semiconductor. By low coverages we mean coverages of about 10 mg/m$^2$ or less. Increasing the coverage beyond about 40 mg/m$^2$ produces little increase in conductivity. The exact coverage will depend on the particular semiconductor and latex chosen and, of course, the desired conductivity. In instances where optical density of the conductive layer is not a problem, for example, where the layer is coated on an opaque support, high coverages can also be useful.

The coating compositions of the present invention form useful conductive coatings by coalescing the latex having associated therewith the semiconductor after the composition has been coated. Typically, coalescence occurs by simply allowing the continuous aqueous phase to evaporate. In some instances, depending upon the exact nature of the polymer particles, it may be necessary to heat the coated composition for a short period to coalesce the latex. This is well-known in the art. In some cases, improved physical properties result when the coalesced layer is cured by heating the layer, such as to about 120° C., for a short period, such as for about 30 sec.

In some embodiments, it may be desirable to coat the layer of the compositions of the present invention with a protective layer. The protective layer can be present for a variety of reasons. For example, the protective layer can be an abrasion-resistant layer or a layer which provides other desirable physical properties. In many embodiments, for example, it can be desirable to protect the conductive layers of the present invention from conditions which could cause the leaching of the acid component of the preferred polyaniline salt semiconductor. Where the conductive layer of the present invention is part of an element having a basic layer, it can be desirable to provide a barrier in the form of a protective layer to prevent the contact of the conductive layer by base. The protective layer is typically a film-forming polymer which can be applied using coating techniques such as those described above for the conductive layer itself. Suitable film-forming resins include cellulose acetate, cellulose acetate butyrate, poly(methyl methacrylate), polyesters, polycarbonates and the like. Currently preferred protective layers include layers of poly(n-butyl acrylate-co-styrene), poly(n-butyl acrylate-co-methyl methacrylate), poly(n-butyl methacrylate-co-styrene), poly(methyl methacrylate) and poly(1,4-butylene-1,1,3-trimethyl-3-phenylindan-4',5-dicarboxylate).

The coating compositions of the present invention are particularly useful in forming antistatic layers for photographic elements or conductive layers in electrographic and electrophotographic elements. The compositions of the present invention can provide high conductivity in layers having low coverages and therefore low optical densities. Thus, the compositions of the present invention are particularly useful in forming antistatic layers for transparent photographic elements such as projection transparencies, motion-picture film, microfilm and the like. Elements of this type comprise a support having coated thereon at least one radiation-sensitive layer. While the conductive layers described herein can be in any position in the photographic element, it is preferred that the conductive layer be coated on the photographic support on the side of the support opposite the side having the coating of the radiation-sensitive material. The coating compositions of the present invention are advantageously coated directly on the support which can have a thin subbing layer as is known in the art, and are then overcoated with the described protective layer. Alternatively, the conductive layers of the present invention can be on the same side of the support as the radiation-sensitive materials and the protective layers can be included as interlayers or overcoats, if desired.

The radiation-sensitive layers of the photographic or electrophotographic elements of the present invention can take a wide variety of forms. The layers can comprise photographic silver salt emulsions, such as silver halide emulsions; diazo-type compositions; vesicular image-forming compositions; photopolymerizable compositions; electrophotographic compositions comprising radiation-sensitive semiconductors; and the like. Photographic silver halide emulsions are particularly preferred and are described for example, in *Product Licensing Index*, Publication 9232, Vol. 92, December, 1971, pages 107–110.

Another particularly useful element is an electrographic element. The conductive layers of the present invention, because of the uniformity of their conductivity and the humidity independence of their conductivity, are excellent conductive layers for such an element. This embodiment of the present invention comprises a support having coated thereon the conductive layer as described herein and, as the outermost layer, a dielectric layer. In this embodiment, the conductive layer can have some density so that high coverages of polyaniline, such as about 35 mg/m$^2$ can be used so that the resulting conductive layer can have very high conductivity. Higher or lower coverages can also be used. The dielectric layer can be formed from any dielectric film-forming material such as any of the polymers listed above as useful as the protective layer. The currently preferred dielectric layer for this embodiment is poly-(ethylene-co-4,4'-isopropylidene bisphenoxyethyl terephthalate) which is described in U.S. Pat. No. 3,703,372. Optionally, and in preferred embodiments, the dielectric layer further comprises a matting agent. Numerous matting agents can be used such as poly(methyl methacrylate) beads described in U.S. Pat. Nos. 2,701,245 and 3,810,759. The currently preferred matting agent is beads of polyethylene, along with some fluorocarbon such as Polyfluo TM #190 beads available from Micro Powders, Inc., of Yonkers, N.Y. This type of matting agent is preferred because it does not swell in the solvents used, thereby preventing bead agglomeration which degrades image quality. The use of electrographic elements of the type described is well-known and is described, for example, by Dessauer and Clark, *Xerography and Related Processes*, Focal Press, 1965, Chapter XVI, pp 439–450.

The resistance of the surface of the coatings of the present invention can be measured using well-known techniques. The resistivity is the electrical resistance of a square of a thin film of material measured in the plane of the material between opposite sides. This is described more fully in R. E. Atchison, *Aust. J. Appl. Sci.* 10 (1954).

The coverage of the imine component of the preferred conductive layer of the present invention can be readily calculated using known methods.

The following examples are presented to illustrate the practice of the invention and are not intended to limit the invention in any way.

EXAMPLE 1

(A) Preparation of a Polyaniline Salt-Loaded Polymer Latex

A 28.4-g portion of a 35.2% by weight solid dispersion of Witco Bond W-210 TM was diluted to a total weight of 400 g with water. To this was added a solution of 2.0 g of N-{p-[4-(p-methoxyanilino)anilino]-phenyl}-1,4-benzoquinone imine in 100 mL of acetone. The acetone was then removed by rotary evaporation, forming a polyaniline-loaded polymer dispersion of the Witco Bond W-210 TM latex. To 393 g of the polyaniline-loaded latex were added 500 g of water, 14 mL of 10% phosphoric acid, and then additional water to total weight of 1,180 g. The resulting dispersion is a polyaniline salt-loaded latex.

(B) Preparation of a Conductive Coating

The polyaniline salt dispersion described above was coated onto a subbed polyester support at a wet coverage of 10.8 mL/m$^2$. The water of the latex dispersion was removed by evaporation with a moderate amount of heat to give a coalesced film having an electrical resistivity of $2 \times 10^6$ ohm/sq and a dry coverage of the imine component of the layer of 17 mg/m$^2$ of support. The integrated optical density of support between 400 and 700 nm was 0.015.

EXAMPLE 2

A 100-g portion of the polyaniline salt-loaded latex prepared in Example 1 was diluted with water to a total weight of 333 g and coated at a rate of 8.6 mL/m$^2$ onto a subbed polyester support. The water was removed by evaporation to give a coalesced film having a surface electrical resistivity of $5 \times 10^7$ ohm/sq and a dry coverage of the polyaniline component of 4.3 mg/m$^2$ of support.

EXAMPLE 3

A 107-g portion of the polyaniline-loaded latex dispersion prepared as in Example 1 was diluted with water to a total weight of 400 g. To this dispersion was added 3.65 mL of a 10% solution of methanesulfonic acid. The resulting polyaniline salt-loaded latex was coated onto a subbed polyester support and the water removed by evaporation. The resulting coalesced film had a surface electrical resistivity of $1.1 \times 10^7$ ohm/sq and a dry coverage of polyaniline component of 17 mg/m$^2$ of support.

EXAMPLE 4

A polyaniline-loaded latex was formed as in Example 1, except that the imine chosen was N-{p-[p-(anilino)anilino]phenyl}-1,4-benzoquinone diimine. An 80-g portion of this polyaniline-loaded polymer dispersion was diluted to a weight of 340 g with water, and 2.70 mL of a 10% solution of phosphoric acid was added. The resulting polyaniline salt-loaded latex dispersion was coated onto a subbed polyester support. The water of the latex was removed by evaporation to give a coalesced film having a surface electrical resistivity of $9.3 \times 10^6$ ohm/sq and a dry coverage of the polyaniline component of 17 mg/ft$^2$ of support.

EXAMPLE 5

(A) Preparation of a Polyaniline Salt-Loaded Latex 30.39 g of a 16.45% solids latex of poly(n-butyl methacrylate-co-vinylbenzyl chloride) (90/10) quaternized with trimethylamine was added 0.10 g of Igepal CO-730 TM Surfactant, as a dispersing aid, and water to give a total weight of 200 g. To this latex was added a solution of 1.0 g of the polyaniline of Example 1 in 55 mL of acetone. The acetone was removed by rotary evaporation to produce a polyaniline-loaded latex. To 1.7 g of the imine-loaded latex dispersion were added 200 g of water, 3.8 mL of a 10% solution of phosphoric acid, and additional water for a total weight of 400 g. The result was a polyaniline salt-loaded latex.

(B) Coating of the Polyaniline Salt-Loaded Latex

The latex from step (A) was coated onto a subbed polyester support at a coverage of 10.8 mL/m$^2$. The water was removed by evaporation to give a coalesced film having a surface electrical resistivity of $5 \times 10^6$ ohm/sq and a dry coverage of the polyaniline component of 17 mg/m$^2$ of support. The integrated optical density in the 400–700 nm region was 0.015.

EXAMPLE 6

This is a comparative example.

A polyaniline salt-loaded latex was prepared according to the procedures set forth in Example 1. The latex used was a 5% by weight latex of poly(n-butyl acrylate-co-2-acrylamido-2-methylpropanesulfonic acid) (90/10), an anionically stabilized latex. The polyaniline was N-{p-[4-(p-methoxyanilino)anilino]phenyl}-1,4-benzoquinone imine which was introduced into the latex using a 0.5% by weight solution of the imine in acetone. To 40 g of this polyaniline-loaded latex were added 7.3 mL of a 2% phosphoric acid solution in water to form the polyaniline salt-loaded latex. This latex was coated onto a subbed polyester support and the water was removed by evaporation to give a coalesced film. The film had an electrical resistivity of $2.0 \times 10^9$ ohm/sq and a coverage of the polyaniline component of 16 mg/m$^2$.

EXAMPLE 7

This is a comparative example.

A conductive coating was prepared using the polyaniline salt of Example 1 in a gelatin binder in the following manner: An amount of 400 mL of a 1% by weight gelatin solution was warmed to 40° C. and 4.0 mL of a solution containing 1% by weight Olin 10G TM surfactant and 0.76 g of 85% phosphoric acid were added. Then 25 mL of a solution containing 0.8 g of the polyaniline of Example 1 in acetone were added to the gelatin solution with strong agitation. The acetone was removed by rotary evaporation leaving a finely divided dispersion of the polyaniline salt in the gelatin solution. The polyaniline salt was not associated with the gelatin. This dispersion was coated on a suitable polyester support so as to produce a coverage of the polyaniline of about 28.6 mg/m$^2$ of support. After drying, the layer had a resistivity of $5.3 \times 10^8$ ohm/sq. This example illustrates that conventional layers of polyaniline salt semiconductors, even when the semiconductor is coated at almost twice the coverage, do not exhibit the high conductivity of the layers of the present invention. Compare Example 1's coverage of 17 mg/m$^2$ and resistivity of $2 \times 10^6$ ohm/sq with comparative Example 7's coverage of 28.6 mg/m$^2$ and resistivity of $5.3 \times 10^8$ ohm/sq.

EXAMPLE 8

This is a comparative example.

A conductive coating was prepared using the polyaniline salt of Example 1 and the latex binder of Example 1, except that the polyaniline salt was not associated with the latex before coating and coalescing. The conductive layer was prepared in the following manner: To 180 mL of water containing 6.2 mL of 10% phosphoric acid and 0.1 g of Igepal CO-730 TM surfactant were added 25 mL of an acetone solution containing 1.05 g of the polyaniline of Example 1 and 0.1 g of Igepal CO-630 TM. The addition was made with strong agitation. The acetone was removed from the resulting solution, resulting in a finely divided dispersion of the polyaniline salt semiconductor in water. To this dispersion were added 14.2 g of a 35% by weight solids dispersion of Witco Bond W-210 TM latex. Under those conditions, no noticeable amount of semiconductor became associated with the latex; rather, a codispersion of semiconductor and latex was formed. This codispersion was coated on subbed polyester support and dried to form a coalesced layer having polyaniline coverage of 10.8 mg/m$^2$ of support. This layer had a resistivity of $3.8 \times 10^7$. A layer coated from the loaded latex described in Example 1 was coated at the same coverage and had a resistivity of $3.5 \times 10^6$. When this comparison was repeated at a coverage of polyaniline of 5.4 mg/m$^2$, resistance of the coating made from codispersion was $4.3 \times 10^8$ ohm/sq, more than an order of magnitude increase, while the coating made from the loaded latex increased by less than a factor of two to $6.3 \times 10^6$ ohm/sq.

EXAMPLES 9–12

These are comparative examples.

In a manner similar to Example 8, coatings were made from codispersions and from coating compositions of the present invention using various polyanilines and acids.

Codispersion preparations (identified a and c)

A solution of 1.0 g of the polyaniline and 0.1 g of Igepal CO-630 TM surfactant in 55 mL of acetone were added to 200 mL of a strongly agitated, aqueous solution containing 0.2 g Igepal 730 TM surfactant and sufficient acid to produce a ratio of 2.5 moles acid/mole polyaniline. The acetone was removed from the resulting solution to produce a dispersion of polyaniline salt in water. To this dispersion were added 5.0 g of latex polymer (Witcobond W-210 TM) solids to form a codispersion of polyaniline salt and latex polymer.

Loaded latex preparation (identified b and d):

Latices loaded with polyaniline salt were prepared in a manner similar to Example 1.

Both the loaded latex of the invention and the codispersion were coated at coverages of 10.8 and 5.4 mg polyaniline/m$^2$. The results are shown in table 1.

EXAMPLES 13–19

Example 1 was repeated, substituting various cationically stabilized latex polymers for Witcobond W-210 TM. In each case, the weight ratio of latex polymer/polyaniline was 5:1. The results are shown in Table 1. The numbers for the polymers are given above in the discussion of useful loadable polymers.

The following table reproduces pertinent data from the above examples. Where appropriate, the designation for the polyaniline and for the binder corresponds to the designation given these components above.

TABLE 1

| Example | Polyaniline | Acid | Binder | Coverage mg/m$^2$ | Resistivity ohm/sq | Comment |
|---|---|---|---|---|---|---|
| 1 | (a) | phosphoric | W-210 | 17 | $2 \times 10^6$ | |
| 2 | (a) | phosphoric | W-210 | 4.3 | $5 \times 10^7$ | |
| 3 | (a) | methane sulfonic | W-210 | 17 | $1.1 \times 10^7$ | |
| 4 | (b) | methane sulfonic | W-210 | 17 | $9.3 \times 10^6$ | |
| 5 | (a) | phosphoric | (1) | 17 | $5 \times 10^6$ | |
| 6 | (a) | phosphoric | cationic latex | 16 | $2.0 \times 10^9$ | comparative |
| 7 | (a) | phosphoric | gelatin | 28.6 | $5.3 \times 10^8$ | comparative |
| 8a | (a) | phosphoric | W-210 | 10.8 | $3.8 \times 10^7$ | comparative codispersion |
| 8b | (a) | phosphoric | W-210 | 10.8 | $3.5 \times 10^6$ | |
| 8c | (a) | phosphoric | W-210 | 5.4 | $4.3 \times 10^8$ | comparative codispersion |
| 8d | (a) | phosphoric | W-210 | 5.4 | $6.3 \times 10^6$ | |
| 9a | (a) | methane sulfonic | W-210 | 10.8 | $2.7 \times 10^6$ | comparative codispersion |
| 9b | (a) | methane sulfonic | W-210 | 10.8 | $1.8 \times 10^6$ | |
| 9c | (a) | methane sulfonic | W-210 | 5.4 | $1.0 \times 10^7$ | comparative codispersion |
| 9d | (a) | methane sulfonic | W-210 | 5.4 | $4.2 \times 10^6$ | |
| 10a | (a) | nitric | W-210 | 10.8 | $>10^{12}$ | comparative codispersion |
| 10b | (a) | nitric | W-210 | 10.8 | $4.6 \times 10^6$ | |
| 10c | (a) | nitric | W-210 | 5.4 | $>10^{12}$ | comparative codispersion |
| 10d | (a) | nitric | W-210 | 5.4 | $2.6 \times 10^7$ | |
| 11a | (b) | phosphoric | W-210 | 10.8 | $>10^{12}$ | comparative codispersion |
| 11b | (b) | phosphoric | W-210 | 10.8 | $7.0 \times 10^6$ | |
| 11c | (b) | phosphoric | W-210 | 5.4 | $>10^{12}$ | comparative codispersion |
| 11d | (b) | phosphoric | W-210 | 5.4 | $2.5 \times 10^7$ | |
| 12a | (c) | phosphoric | W-210 | 10.8 | $1.7 \times 10^8$ | comparative codispersion |
| 12b | (c) | phosphoric | W-210 | 10.8 | $4.5 \times 10^6$ | |
| 12c | (c) | phosphoric | W-210 | 5.4 | $8.3 \times 10^8$ | comparative codispersion |
| 12d | (c) | phosphoric | W-210 | 5.4 | $1.3 \times 10^7$ | |
| 13 | (a) | phosphoric | 2 | 10.8 | $5.0 \times 10^6$ | |
| 14 | (a) | phosphoric | 1 | 10.8 | $4.4 \times 10^6$ | |
| 15 | (a) | phosphoric | 3 | 10.8 | $3 \times 10^6$ | |
| 16 | (a) | phosphoric | 4 | 10.8 | $1.1 \times 10^7$ | |
| 17 | (a) | phosphoric | 5 | 10.8 | $5 \times 10^6$ | |
| 18 | (a) | phosphoric | 6 | 10.8 | $4.2 \times 10^6$ | |
| 19 | (a) | phosphoric | 7 | 10.8 | $3.6 \times 10^6$ | |

EXAMPLE 20

An electrographic element was prepared by coating a conductive layer on a subbed poly(ethylene terephthalate) film support and then overcoating the conductive layer with a dielectric layer. The conductive layer was coated using the coating composition described in Example 1, wherein the weight ratio of latex to polyaniline was 5:1, so as to produce a coverage of polyaniline salt of about 30 mg/m$^2$. The dielectric layer was a 3.5-micron layer of poly(ethylene-co-4,4'-isopropylidene bisphenoxyethyl terephthalate) (50:50) containing 3.5 weight percent Polyfluo ™ #190 matt beads. A spreading agent as described in U.S. Pat. No. 3,861,915 was used in coating the dielectric layer.

The described electrographic element was imaged on a Gould #5005 Plotter/Printer stylus recording device and toned with a liquid electroscopic developer. Image quality was excellent.

The invention has been described in detail with particular reference to preferred embodiments, but it will be understood that variations and modifications can be effected without departing from the spirit and scope of the invention.

We claim:

1. In an element comprising a support having thereon a conductive layer comprising a coalesced, cationically stabilized latex and a semiconductor, the improvement wherein said latex and said semiconductor are chosen so that said semiconductor is associated with said latex before coalescing and said semiconductor is a polyaniline acid addition salt.

2. An element according to claim 1 wherein said conductive layer is coated with a protective layer.

3. An element according to claim 2 wherein said protective layer comprises a polymer selected from the group consisting of poly(n-butyl acrylate-co-styrene), poly(n-butyl acrylate-co-methyl methacrylate), poly(n-butyl methacrylate-co-styrene) and poly(methyl methacrylate).

4. An element according to claim 1 wherein the weight ratio of latex to polyaniline component is between 4:1 and 10:1.

5. An element according to claim 1 wherein the polyaniline of said polyaniline salt is selected from the group consisting of:

N-{p-[4-(p-methoxyanilino)anilino]phenyl}-1,4-benzoquinone imine and

N-{p-[p-(anilino)anilino]phenyl}-1,4-benzoquinone diimine.

6. An element according to claim 1 wherein said polyaniline salt is the phosphoric acid addition salt.

7. An element according to claim 1 wherein said coalesced latex comprises cationically stabilized, coalesced, substantially linear, polyurethane urea.

8. An element according to claim 2 wherein said coalesced latex comprises coalesced particles of poly(N-butylmethacrylate-co-vinylbenzyl chloride) (90/10) quaternized with trimethylamine.

* * * * *

UNITED STATES PATENT AND TRADEMARK OFFICE
CERTIFICATE OF CORRECTION

PATENT NO. : 4,237,194

DATED : December 2, 1980

INVENTOR(S) : Donald A. Upson and David J. Steklenski

It is certified that error appears in the above-identified patent and that said Letters Patent are hereby corrected as shown below:

Column 1, line 13, "saltcontaining" should read --- salt-containing ---.

Column 5, line 24, a "," should be inserted after "minutes"; line 35, "pages" should read ---page---.

Column 6, line 20, after the formula insert ---or---; line 23, " $-Z\{R^5 - Z - \underset{O}{\overset{\|}{C}} - R^6 - \underset{O}{\overset{\|}{C}} - Z\}_I - R^5 - Z$ " should read --- $-Z\{R^5 - Z - \underset{O}{\overset{\|}{C}} - R^6 - \underset{O}{\overset{\|}{C}} - Z\}_I - R^5 - Z$ ---.

Column 7, line 8, "dispersion" should read ---dispersions---.

Column 11, line 47, "Polyfluo TM" should read ---Polyfluo$^{TM}$---.

UNITED STATES PATENT AND TRADEMARK OFFICE
CERTIFICATE OF CORRECTION

PATENT NO.   4,237,194
DATED        December 2, 1980
INVENTOR(S)  Donald A. Upson and David J. Steklenski It is certified that error appears in the above-identified patent and that said Letters Patent are hereby corrected as shown below:

Column 12, line 7, " W-210 TM " should read --- W-210$^{TM}$ ---; line 13, " W-210 TM " should read --- W-210$^{TM}$ ---.

Column 13, line 4, before "30.39" insert ---To---; line 7, "730 TM" should read ---730$^{TM}$---; line 52, "10G TM" should read --- 10G$^{TM}$ ---.

Column 14, line 12, "CO-730 TM" should read --- CO-730$^{TM}$ ---; line 15, "CO-630 TM" should read --- CO-630$^{TM}$ ---; line 20, " W-210 TM " should read --- W-210$^{TM}$ ---; line 47, "CO-630 TM" should read --- CO-630$^{TM}$ ---; line 49, "730 TM" should read --- 730$^{TM}$ ---; line 54, " W-210 TM " should read --- W-210$^{TM}$ ---; line 67, "210 TM" should read --- 210$^{TM}$ ---.

UNITED STATES PATENT AND TRADEMARK OFFICE
CERTIFICATE OF CORRECTION

PATENT NO. : 4,237,194

DATED : December 2, 1980

INVENTOR(S) : Donald A. Upson and David J. Steklenski

It is certified that error appears in the above-identified patent and that said Letters Patent are hereby corrected as shown below:

Column 15, line 55, "Polyfluo TM" should read ---Polyfluo$^{TM}$---.

Signed and Sealed this

Fourteenth Day of April 1981

[SEAL]

Attest:

RENE D. TEGTMEYER

Attesting Officer

Acting Commissioner of Patents and Trademarks